United States Patent [19]

Ball

[11] E Re. 28,540

[45] Reissued Sept. 2, 1975

[54] COMPOSITE KNOCKDOWN PUMP

[75] Inventor: Rowland W. Ball, Long Beach, Calif.

[73] Assignee: Borg-Warner Corporation, Chicago, Ill.

[22] Filed: Mar. 11, 1974

[21] Appl. No.: 450,133

Related U.S. Patent Documents

Reissue of:

[64] Patent No.: 3,671,138
Issued: June 20, 1972
Appl. No.: 111,962
Filed: Feb. 2, 1971

[52] U.S. Cl. ..... 415/111; 415/99; 415/198; 417/360

[51] Int. Cl. ..... F01d 11/00

[58] Field of Search ..... 415/98, 111, 198; 417/360; 64/23

[56] References Cited

UNITED STATES PATENTS

| | | | |
|---|---|---|---|
| 1,037,244 | 9/1912 | Guy | 415/111 |
| 1,287,367 | 12/1918 | Lowenstein | 415/98 |
| 1,334,461 | 3/1920 | Kerr | 415/98 |
| 2,358,744 | 9/1944 | Stepanoff | 415/98 |
| 3,038,411 | 6/1962 | Hornschuch | 417/360 |
| 3,303,994 | 2/1967 | Morooka | 417/360 |
| 3,514,213 | 5/1970 | Stockton | 415/198 |

FOREIGN PATENTS OR APPLICATIONS

| | | |
|---|---|---|
| 423,490 | 4/1967 | Switzerland |

*Primary Examiner*—C. J. Husar
*Attorney, Agent, or Firm*—Aubrey L. Burgess

[57] ABSTRACT

A centrifugal fluid pump suitable for assembly into an operable unit within a confined space including a plurality of impellers each mounted within respective fluid discharge members and in respective association with a plurality of fluid suction inlet members; such impellers being mounted on a composite drive shaft having a plurality of members integrally assembled to provide a high degree of radial and axial alignment and a high torque transfer capability.

19 Claims, 9 Drawing Figures

3 Sheets-Sheet 1

INVENTOR
ROWLAND E. BALL
BY John O. Evans, Jr.
James M. Lapius

INVENTOR
ROWLAND E. BALL
BY John O. Evans, Jr.
James M. Poppers

INVENTOR
ROWLAND E. BALL
BY John O. Evans, Jr.
Jerome H. Rappaport

COMPOSITE KNOCKDOWN PUMP

Matter enclosed in heavy brackets [ ] appears in the original patent but forms no part of this reissue specification; matter printed in italics indicates the additions made by reissue.

BACKGROUND OF THE INVENTION

This invention generally pertains to a centrifugal pump which may be readily assembled into operative condition within a confined space with previously fitted and balanced components and also under conditions where the individual components and subassemblies must pass through confined passageways to the space where the pump is assembled. An exemplary application for such a pump would be its service as a water jet propelling unit when installed in the confined propulsion room of a marine, vessel or boat having small hatchways through one or more decks. The pump components and subassemblies would need be transferred through such small hatchways for assembly and also for subsequent disassembly and replacement. Some of the features and techniques relating to the embodiment disclosed herein have been previously developed as will become apparent from review of the description and drawing.

SUMMARY OF THE INVENTION

An object of this invention is to provide a knockdown centrifugal pump having previously fitted and/or balanced components which may be transferred through a small passage and assembled in a confined space.

Another object of this invention is to provide a pump having readily interchangeable replacement components.

A further object of this invention is to provide a pump having an improved weight to capacity ratio.

The foregoing and other objects and advantages are attained in a knockdown centrifugal pump having a plurality of impellers mounted on a composite rotary drive shaft with each of the impellers being mounted within a respective circular fluid discharge housing and mounted in fluid communication with a respective circular fluid suction housing and the drive shaft having a knockdown connection means for supporting said shaft in radial and axial alignment. The connection means includes two tubular sections of the shaft with each section being provided with teeth radially defined in an annular area about one end thereof which are provided to mesh together and support the shaft sections in alignment. A support mandrel is mounted within the shaft sections and connected to one of the shaft sections with tensioning means removably connected to the mandrel and to the other of the shaft sections for stressing the mandrel in tension between the shaft sections and thereby drawing the teeth into forcible engagement. Adjustable retaining means is connected to the mandrel and to the other of the shaft sections for retaining the mandrel in tension and the teeth in aligning engagement. At least one of the knockdown connection means is provided in the drive shaft between the impellers. Sleeve bearing means adapted for lubrication by pumped fluids is mounted in the pump to support the shaft between the impellers. "Knockdown" as used herein means the features of being easily assembled or disassembled.

DESCRIPTION OF THE PREFERRED EMBODIMENT

Figure 1:
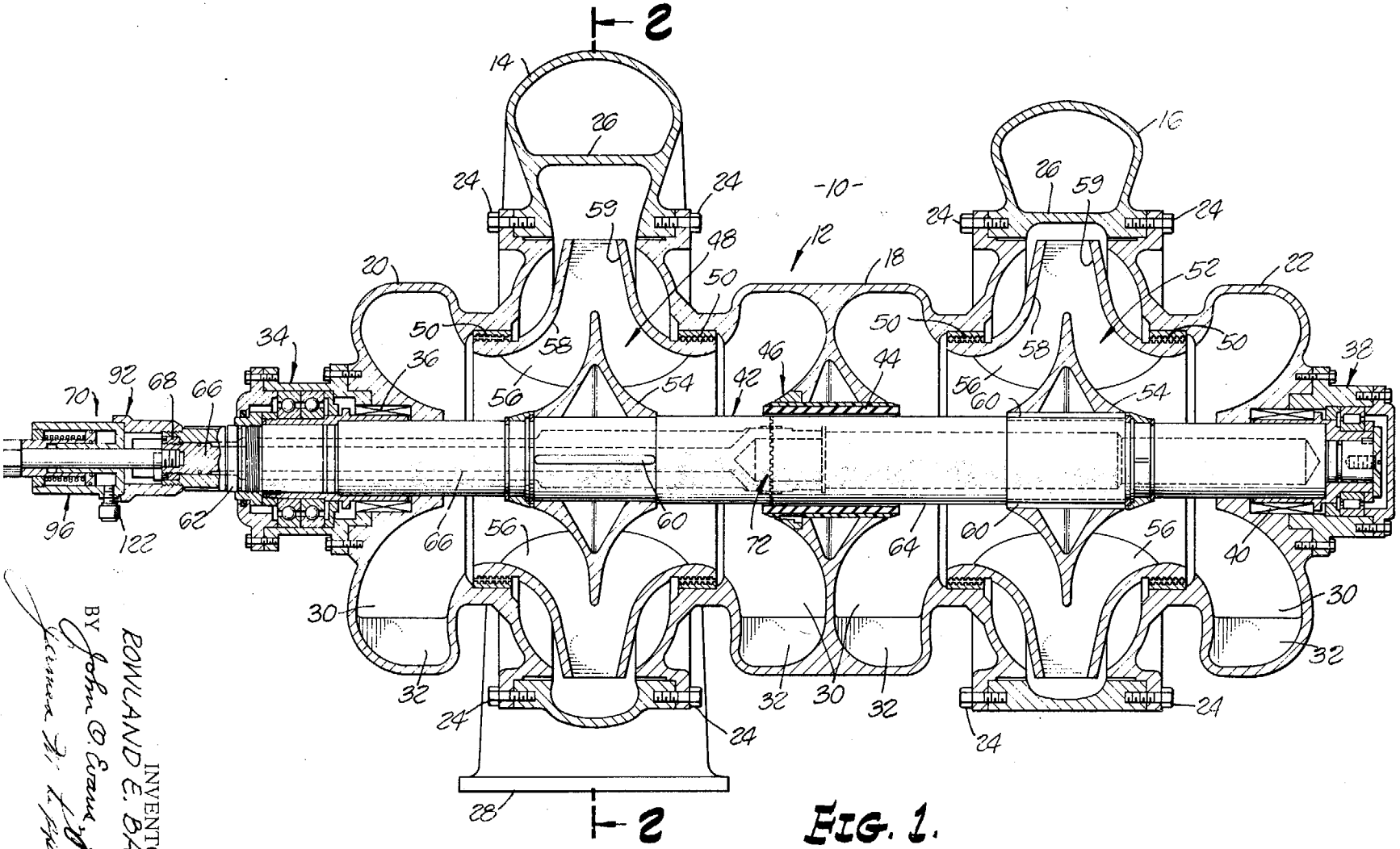
FIG. 1 is a longitudinal sectional view of a centrifugal pump embodying the invention.

Referring to FIG. 1 a pump assembly 10 is shown having a composite housing 12. Fluid discharge housings 14 and 16 are mounted along the axis of housing 12 on either side of a common center suction housing 18. A suction housing 20 is axially mounted with discharge housing 14 at the left (driven) end of the pump and a suction housing 22 is axially mounted with discharge housing 16 at the right end of the pump. The respective suction and discharge housings are appropriately machined for assembly into proper alignment when assembled as shown and are connected in sealed relation to form composite housing 12 by means of fasteners 24, such as cap screws or studs and nuts, for example.

Figure 2:
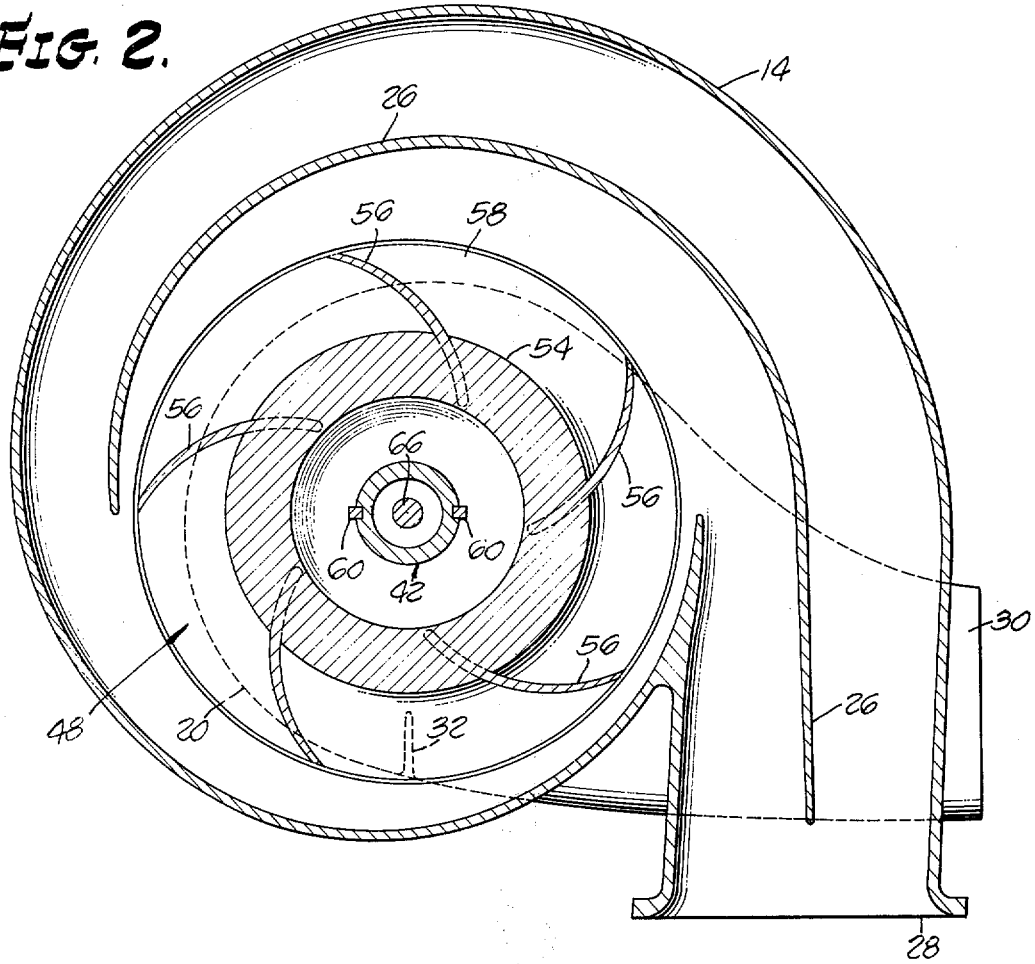
FIG. 2 is a transverse sectional view of the centrifugal pump taken along the line 2—2 of FIG. 1.

As shown in FIGS. 1 and 2, discharge housings 14 and 16 are volute in configuration and each housing is equipped with an arcuately disposed rib 26 which has the dual purpose of directing the fluid discharge from such housing and also of providing additional strength and rigidity to such housing. The volutes of housing 14 and 16 terminate in fluid outlets 28. In the embodiment shown, the fluid outlet for housing 16 terminates at a different tangential angle than for housing 14 and thus does not show in the drawing since its provision will become apparent for a particular installation. Housings 18, 20 and 22 as shown provide respective fluid suction inlets 30 on each side of discharge housings 14 and 16. Each of the housings are provided with axially disposed radial vanes 32 to prevent swirling of fluids entering inlets 30. The positions of vanes 32 as shown are exemplary and may be rotated as required. It is to be noted that the flow direction of each of fluid outlets 28 and flow inlets 30 may be provided as necessary to properly connect pump assembly 10 into a particular installation.

As shown in FIG. 1, left suction housing 20 is equipped with a ball bearing assembly 34 and a fluid seal assembly 36. Right suction housing 22 is likewise equipped with a roller bearing assembly 38 and a fluid seal assembly 40. A composite impeller drive shaft 42, later described, is supported in axial and rotatable relation within housing 12 by bearing assemblies 34 and 38 in a well known manner. Seal assemblies 36 and 40 provide a fluid seal around drive shaft 42 between the interior and the exterior of housing 12.

Figure 3:
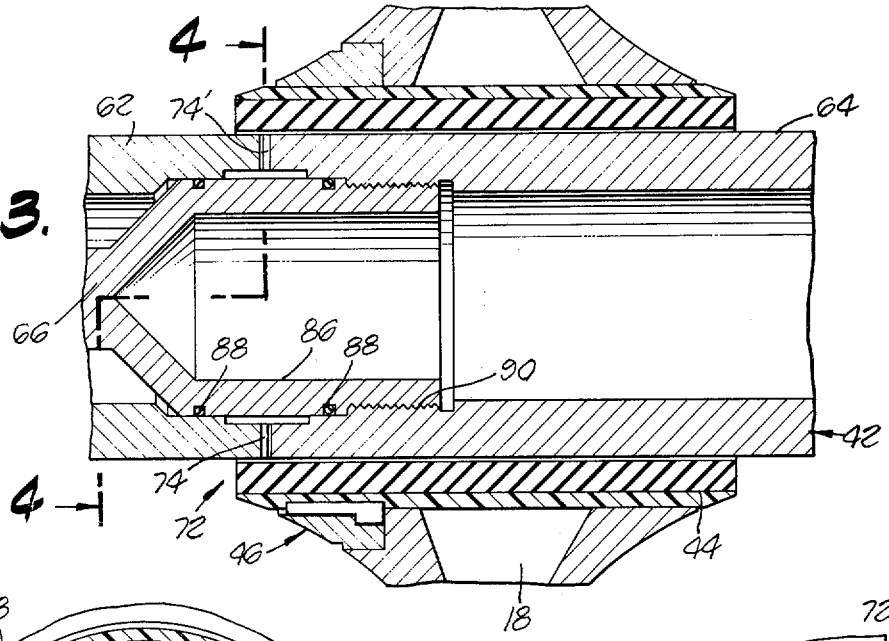
FIG. 3 is an enlarged sectional view of the center shaft bearing and shaft connection shown in FIG. 1.
Figure 4:
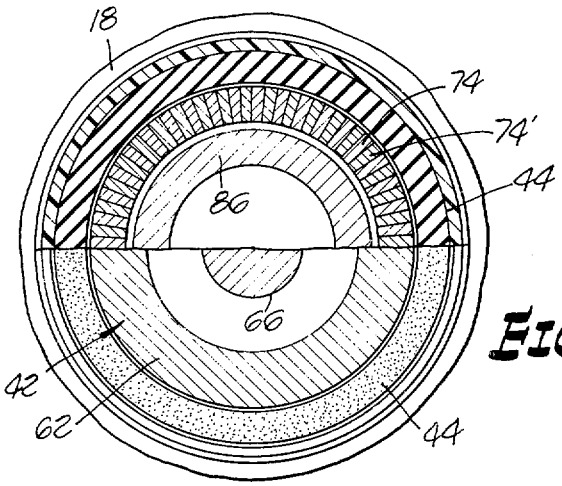
FIG. 4 is a stepped transverse sectional view taken along the line 4—4 of FIG. 3.

As shown in FIGS. 1 and 3, center suction housing 18 is equipped with a composite sleeve bearing assembly 44 which serves to provide intermediate rotatable support for drive shaft 42. Bearing assembly 44 may be retained in suction housing 18 by a retainer key and ring arrangement 46, as shown, or by equivalent means. Sleeve bearing may be fabricated rubber sleeve encircled by a plastic and layer wound glass laminate, as shown, and will be lubricated by pumped fluids within suction housing 18. Bearing assembly 44 may be substituted by other bearing embodiments for use with different kinds of pumped fluids, as may be required.

As shown in FIGS. 1 and 2, a fluid impeller structure 48 is mounted on drive shaft 42 and longitudinally disposed in fluid discharge alignment within discharge housing 14. Cylindrical extensions formed on each of impeller 48 are disposed in accommodating recesses defined in suction housings 18 and 20. As shown, impeller 48 and housings 18 and 20 are equipped with complementary labyrinth fluid flow restriction structure 50 which purpose are to restrict fluid flow from within the discharge housing back into the suction housing. Such labyrinth flow restriction structures are well developed and will not be described further herein.

Impeller 48 and impeller 52, later mentioned, are of generally conventional design and like elements bear the same numbers in the drawing. Impeller 52 is mounted on drive shaft 42 within discharge housing 16 as previously described for the mounting of impeller 48 within discharge housing 14. Flow restriction structures 50 are also provided with impeller 52 as shown. Impellers 48 and 52 are mounted in abutment against annular shoulders provided in drive shaft 42 and are fixed against rotation on the shaft by keys 60 fitted within slots between the shaft and impellers. Impellers 48 and 52 each include a hub 54 having a plurality of curved vanes 56 enclosed by shrouds 58 and 59. Shrouds 58 and 59 are formed to define fluid outlets into dischage housings 14 and 16 and to define fluid inlets from the housings 18, 20 and 22 as shown.

The pump assembly 10 depicted in FIG. 1 is shown in general proportion but not to finite scale. As exemplary dimensions to give additional perspective for pumps embodying the present invention, shaft 42 may be about 80 inches (2.03 meters) in total length and about 6 inches (152.4 millimeters) in outside diameter at bearing assembly 44. Also, such a pump may be provided to utilize up to about 4,500 horsepower when rotated up to about 1450 volutions per minute and when pumping at a low discharge head.

Referring now to FIGS. 1 and 3, composite drive shaft 42 is shown to include a first (left) tubular shaft section 62, a second (right) shaft section 64. A retaining mandrel 66 is threadedly secured into one end of shaft section 64 and extends through shaft section 62 to be secured into position as shown by a retaining spanner nut 68 threadedly connected to mandrel 66 and abutting shaft 62 within a shoulder counterbore provided in shaft section 62. A mandrel tensioning device 70, later described, is removably attached to shaft section 62 and to mandrel 66.

Shaft section 62 and shaft section 64 are joined in axial and radial alignment by provision of a connection or coupling arrangement 72, shown in FIGS. 1 and 3–5. Teeth 74 and 74′ are developed in generally radial disposition in the annular faces of shaft sections 62 and 64. The development of teeth 74 and 74′ must be appropriate to provide meshing with the shaft sections in alignment. The preferred tooth profile and configuration is later described but splines or other tooth profiles, such as rectangular or triangular, may be provided with some measure of success, depending on the size of the shaft 42, the rotational speed of the shaft and the amount of lateral and torque loading on the shaft.

Couplings or connections such as shown in FIGS. 3–7 and referred to herein as a "curvate" coupling have been well developed to meet the need for couplings requiring extreme accuracy and maximum load capacity. The curvate design provides an accurate, light, compact, and self-contained connection in which the teeth 74 and 74′ both serve to center and drive, as compared to other designs where the teeth drive only, and other means of centering are necessary. The curvate coupling 72 has curved radial teeth 74 and 74′ of constant depth, which are cut and ground into the annular face of each shaft section. These teeth may be produced with a wide range of pressure angles and chamfered engaging surfaces. The curvate coupling 72 is a precision face spline for joining shaft sections 62 and 64 to form a single operating unit. This coupling has the advantages of accurate alignment, precision centering and positive drive.

Figure 7:
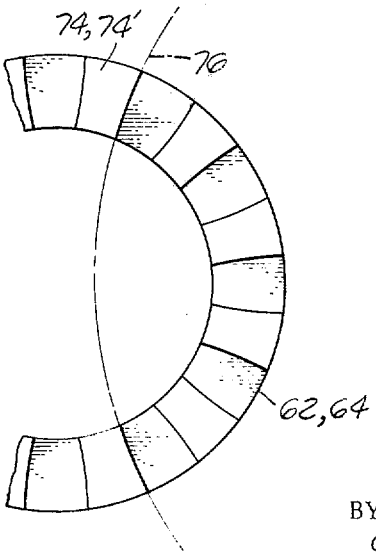

The curvature of curvate teeth 74 and 74′ (see FIGS. 6 and 7) exists because the members are ground with a cup-type grinding wheel (not shown). One member may be made with the outside edge 76 of a wheel, as shown in FIG. 7, to form a concave or hourglass-shaped tooth. The mating member shown in FIG. 6 may be made with the inside edge 78, thus producing a convex or barrel-shaped tooth. The radius of the cutting surface is selected to give the desired length of tooth contact.

In contrast with other types of couplings, the curvate couplings 72 has teeth 74 and 74′ spaced continuously about the entire circumference, each tooth tapering toward the center. Any attempt therefore to move one tooth out of position is resisted by all the other teeth in the coupling. The controlled matching of the curved teeth in such a coupling is also an important factor in resisting movement and in centering shaft sections 62 and 64.

This centering action is of prime importance in maintaining the balance of the pump impeller assembly. Much of the success of such a curvate coupling design resides in the ability of the composite impeller assembly to remain in balance under continuous operation. Furthermore, the impeller assembly can be disassembled and then reassembled with the same teeth mating without disturbing the original accuracy and balance. The interchangeability of ground curvate couplings simplifies replacement of worn or damaged impeller assemblies.

Figure 5:
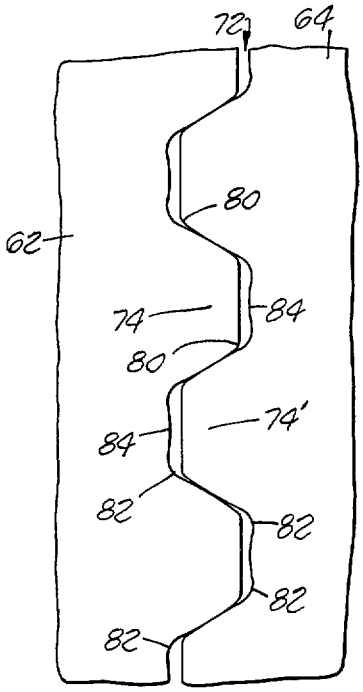
FIG. 5 is an enlarged view of the coupling teeth from the outside diameter of the shaft connection shown in FIGS. 1 and 3.
Figure 6:
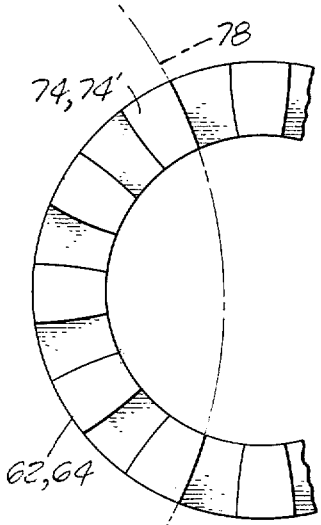
FIGS. 6 and 7 are enlarged views showing the development of the meshing coupling teeth of the shaft connection shown in FIGS. 3 and 4.

An enlarged view of the ground curvate coupling teeth at the outside diameter is shown in FIG. 5. A chamfer 80 on the top of the teeth is automatically ground as the tooth slot is being ground. This permits a larger fillet radius 82 to be used, thus strengthening the teeth. Also shown is a characteristic gable bottom 84 which eliminates any possibility of forming a stress-raising step in the root of the tooth.

Another design feature of such curvate couplings permits localization of the tooth contact area. The tooth contact for most applications should be centrally located and the length of contact should be approximately 50% of the face width when meshed with the mating control coupling under light stress. Under increased stress imposed by mandrel 66 the tooth bearing area will increase, thus insuring a uniform distribution of contact over the entire tooth surface. The tension in the mandrel 66 must be sufficient to keep the coupling teeth in full engagement under all conditions of operation.

In selecting the required coupling size, three factors determine the load which the coupling teeth will carry. The teeth must (1) be strong enough so they will not shear, (2) have sufficient surface area to prevent pitting, galling, and fretting, and (3) be machined from enough material to withstand tension across the root of the tooth space.

The shear strength is dependent upon the cross-sectional area of all the teeth. Since there is no backlash in a curvate coupling, the teeth 74 and 74' are in intimate contact so that half of the metal is ordinarily removed in both members, regardless of the number of teeth or their depth. With this condition, the torque load is carried over a shear area approximately half as large as in a one-piece hollow shaft. The allowable surface loading will depend on the contact area of the coupling teeth.

Supplemental specific information concerning couplings such as described is available from the Gleason Works, 100 University Ave., Rochester, N.Y., U.S.A.

As seen in FIGS. 1 and 3, tensioning mandrel 66 is threaded at its left end to accommodate threaded retainer nut 68 and also of sufficient outside diameter near its left end to fit closely enough within the inside diameter of shaft section 62 to establish a fluid seal with provision of sealing means such as the O-ring seal shown. The mandrel is thereon reduced in diameter to near coupling 72 in order to provide an appropriate cross-sectional area to permit a predetermined elastic strain or "stetch" in the mandrel when placed in tension. The right end of mandrel 66 terminates in an enlarged sleeve 86 which fits closely within accommodating bores defined in shaft sections 62 and 64 at the juncture of coupling 72. A fluid seal is established between sleeve 86 and shaft sections 62 and 64, and between the interior and exterior of the shaft sections, by seal means such as O-rings 88. The end of sleeve 86 terminates with machine threads which fit into accommodating threads defined in shaft section 64 to form a threaded connection 90 as shown.

It is noted that the close fit of sleeve 86 within the shaft sections as shown can and would necessarily be utilized to axially align the shaft sections with some types of coupling teeth or other types of connection as previously mentioned. Such expedient could become undesirable or unsatisfactory under some service conditions such as the example given herein. The curvate type coupling 72, as herein described, does not need support of sleeve 86 for alignment and thus the fit between the sleeve and the shaft sections should be close enough only to assist the sealing function of O-rings 88. As shown, counterbores are defined in shaft sections 62 and 64 within coupling 72 to provide clearance between sleeve 86 and teeth 74 and 74' and thereby prevent possible interference.

Figure 8:
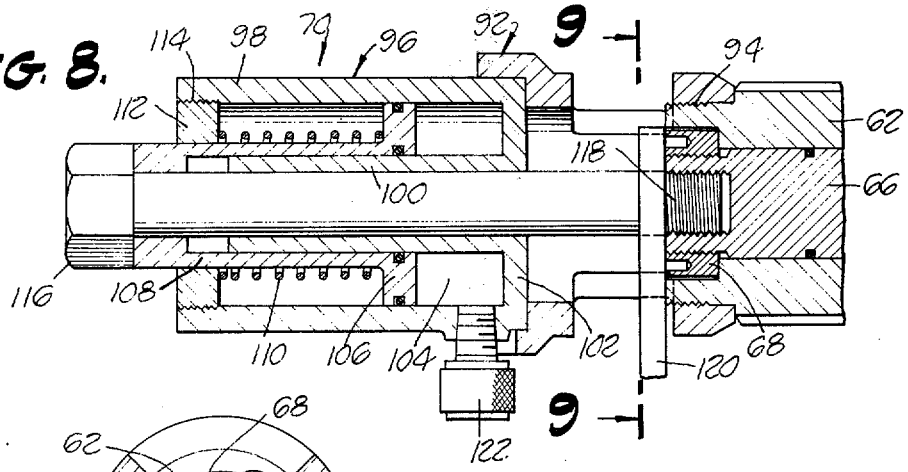
FIG. 8 is an enlarged sectional view of hydraulic tensioning apparatus shown at the left of FIG. 1.
Figure 9:
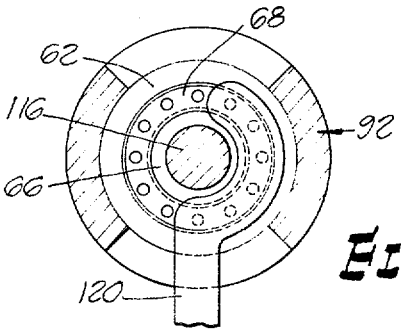
FIG. 9 is a transverse sectional view taken along the line 9—9 of FIG. 8.

Referring now to FIGS. 8 and 9, a hydraulic tensioning means or jack 70 is shown in operative connection with shaft section 62 and tensioning mandrel 66. Jack 70 includes a cylindrical support cage 92 which is generally tubular in shape and provided with lateral access windows as shown. At its right end cage 92 is provided with female machine threads which are adapted to be fitted over accommodating threads provided on shaft section 62 to form a threaded connection 94. An annular piston chamber housing 96 is nested into a counterbore defined in the other end of cage 92. Housing 96 includes a cylindrical outer wall 98 and a cylindrical inner wall 100 joined by an annular wall 102 to form an annular piston chamber 104 in which is fitted a movable annular piston 106. Piston 106 is equipped with a sleeve 108 which extends from the open end of chamber 104. Piston 106 and sleeve 108 are urged to retract into chamber 104 by a spring 110 disposed about the sleeve and retained in compression by means of a threaded bushing 112 fitted into an accommodating female thread in wall 98 to form a threaded connection 114. A threaded lag bolt 116 abuts the free end of sleeve 108 and extends through inner wall 100 into a threaded connection 118 provided by an accommodating thread defined in the end of shaft section 62. A typical spanner wrench 120 equipped with pins, as shown for illustration, may be inserted through the windows of cage 92 and the pins engaged into the spanner holes of retainer nut 68 to rotate the nut on mandrel 66. The outer wall 98 of housing 96 is equipped with a hydraulic pressure fitting 122 through which hydraulic fluid may be introduced under pressure into chamber 104. Such fluid will tend to displace piston 106 and sleeve 108 and thereby exert tension on bolt 166 and mandrel 66 with respect to shaft section 62.

In assembly of composite shaft 42, mandrel 66 may be placed within shaft section 62 and threaded into engagement with shaft section 64 before the teeth 74 and 74' are engaged to form coupling 72. Coupling 72 may next be engaged by retainer nut threaded onto mandrel 66 in hand tight relation by hand or with spanner wrench 120 as desired. Tensioning jack 70 may then be installed and sufficient fluid under pressure is applied into chamber 104 to establish the proper degree of tension in mandrel 66 to obtain proper engagement of teeth 74 and 74'. When the proper pressure is reached, as shown by a suitable pressure indicator, the retainer nut 68 is further tightened with the spanner wrench 120. The jack 70 is thereon removed. The composite shaft 42 is then functional as an integral unit.

It is of note that the shaft 42 may be assembled as described before or after installation of impellers 48 and 52; the complete impeller assembly may then be dynamically balanced as may be required, and the balanced unit may then be disassembled and later reassembled as pump assembly 10 is being assembled with the resulting impeller assembly being maintained in balance.

While only one preferred embodiment has been shown and described herein, other embodiments and variations will become apparent to those skilled in the art, all of which are intended to be included in the spirit of the invention as herein set forth.

I claim:

[1. A centrifugal pump comprising:

a. a plurality of impellers mounted on a composite rotary drive shaft;

b. each of said impellers being mounted within a respective circular fluid discharge housing and mounted in fluid communication with a circular fluid suction housing;

c. said drive shaft having a knockdown connection means for supporting said shaft in radial and axial alignment;

d. said connection means including two tubular shaft sections with each of said shaft sections being provided with teeth radially defined in an annular area about one end thereof;

e. said teeth being provided to mesh together in forcible engagement and thereby support said shaft sections in alignment;

f. a support mandrel mounted within said shaft sections and connected to one of said shaft sections; and g. adjustable retaining means connected to said mandrel and to the other of said shaft sections for retaining said mandrel in tension and said teeth in forcible engagement.]

[2. The pump of claim 1 wherein at least one of said knockdown connections means is provided in said drive shaft between said impellers.]

3. *A centrifugal pump comprising:*

*a plurality of impellers mounted on a composite rotary drive shaft;*

*each of said impellers being mounted within a respective circular fluid discharge housing and mounted in fluid communication with a circular fluid suction housing;*

*said drive shaft having a knockdown connection means for supporting said shaft in radial and axial alignment;*

*said connection means including two tubular shaft sections with each of said shaft sections being provided with teeth radially defined in an annular area about one end thereof;*

*said teeth being provided to mesh together in forcible engagement and thereby support said shaft sections in alignment;*

*a support mandrel mounted within said shaft sections and connected to one of said shaft sections;*

*adjustable retaining means connected to said mandrel and to the other of said shaft sections for retaining said mandrel in tension and said teeth in forcible engagement; and*

[The pump of claim 1 wherein] sleeve bearing means adapted for lubrication by pumped fluids [is] mounted in said pump to support said shaft between said impellers.

4. *A centrifugal pump comprising:*

*a plurality of impellers mounted on a composite rotary drive shaft;*

*each of said impellers being mounted within a respective circular fluid discharge housing and mounted in fluid communication with a circular fluid suction housing;*

*said drive shaft having a knockdown connection means for supporting said shaft in radial and axial alignment;*

*said connection means including two tubular shaft sections with each of said shaft sections being provided with teeth radially defined in an annular area about one end thereof;*

*said teeth being provided to mesh together in forcible engagement and thereby support said shaft sections in alignment;*

*a support mandrel mounted within said shaft sections and connected to one of said shaft sections;*

*adjustable retaining means connected to said mandrel and to the other of said shaft sections for retaining said mandrel in tension and said teeth in forcible engagement; and*

[The pump of claim 1 wherein] the teeth defined about said one of said shaft section [are] *being* concave in profile as viewed from the axis thereof and the teeth defined about said other of said shaft section [are] *being* convex as viewed along the axis thereof.

[5. The pump of claim 1 wherein a fluid suction housing is axially mounted on each end of each said fluid discharge housing.]

[6. The pump of claim 1 including tensioning means removably connected to said mandrel and to said other of said shaft sections for stressing and mandrel in tension and thereby drawing said teeth into forcible engagement.]

7. *A centrifugal pump comprising:*

*a plurality of impellers mounted on a composite rotary drive shaft;*

*each of said impellers being mounted within a respective circular fluid discharge housing and mounted in fluid communication with a circular fluid suction housing;*

*said drive shaft having a knockdown connection means for supporting said shaft in radial and axial alignment;*

*said connection means including two tubular shaft sections with each of said shaft sections being provided with teeth radially defined in an annular area about one end thereof;*

*said teeth being provided to mesh together in forcible engagement and thereby support said shaft sections in alignment;*

*a support mandrel mounted within said shaft sections and connected to one of said shaft sections;*

*adjustable retaining means connected to said mandrel and to the other of said shaft sections for retaining said mandrel in tension and said teeth in forcible engagement;*

*tensioning means removably connected to said mandrel and to said other of said shaft sections for stressing said mandrel in tension and thereby drawing said teeth into forcible engagement; and*

[The pump of claim 6 wherein] said tensioning means [includes] *comprising* hydraulic actuating means.

8. *A centrifugal pump comprising:*

*a plurality of impellers mounted on a composite rotary drive shaft;*

*each of said impellers being mounted within a respective circular fluid discharge housing and mounted in fluid communication with a circular fluid suction housing;*

*said drive shaft having a knockdown connection means for supporting said shaft in radial and axial alignment;*

*said connection means including two tubular shaft sections with each of said shaft sections being provided with teeth radially defined in an annular area about one end thereof;*

*said teeth being provided to mesh together in forcible engagement and thereby support said shaft sections in alignment;*

*a support mandrel mounted within said shaft sections and connected to one of said shaft sections;*

*adjustable retaining means connected to said mandrel and to the other of said shaft sections for retaining said mandrel in tension and said teeth in forcible engagement;*

*tensioning means removably connected to said mandrel and to said other of said shaft sections for stressing said mandrel in tension and thereby drawing said teeth into forcible engagement; and*

[ The pump of claim 6 wherein ] said tensioning means *comprising* [comprises] removable piston and cylinder means adapted to stress said mandrel means in response to injection of hydraulic fluid under pressure.

9. *A centrifugal pump comprising:*

*a plurality of impellers mounted on a composite rotary drive shaft;*

*each of said impellers being mounted within a respective circular fluid discharge housing and mounted in fluid communication with a circular fluid suction housing;*

*said drive shaft having a knockdown connection means for supporting said shaft in radial and axial alignment;*

*said connection means including two tubular shaft sections with each of said shaft sections being provided with teeth radially defined in an annular area about one end thereof;*

*said teeth being provided to mesh together in forcible engagement and thereby support said shaft sections in alignment;*

*a support mandrel mounted within said shaft sections and connected to one of said shaft sections; and adjustable retaining means connected to said mandrel and to the other of said shaft sections for retaining said mandrel in tension and said teeth in forcible engagement; and*

[ The pump of claim 1 wherein ] each said suction housing [includes] *comprising* a radially disposed baffle therein for preventing swirling of pumped fluids about the axis of said drive shaft.

10. *A centrifugal pump comprising:*

*a plurality of impellers mounted on a composite rotary drive shaft;*

*each of said impellers being mounted within a respective circular fluid discharge housing and mounted in fluid communication with a circular fluid suction housing;*

*said drive shaft having a knockdown connection means for supporting said shaft in radial and axial alignment;*

*said connection means including two tubular shaft sections with each of said shaft sections being provided with teeth radially defined in an annular area about one end thereof;*

*said teeth being provided to mesh together in forcible engagement and thereby support said shaft section in alignment;*

*a support mandrel mounted within said shaft sections and connected to one of said shaft sections; and adjustable retaining means connected to said mandrel and to the other of said shaft sections for retaining said mandrel in tension and said teeth in forcible engagement; and*

[ The pump of claim 1 wherein ] said teeth [ are ] provided *being* of curvate configuration.

[ 11. A centrifugal pump comprising:

a. a plurality of impellers mounted on a composite rotary drive shaft;

b. each of said impellers being mounted within a respective circular fluid discharge housing and mounted in fluid communication with a circular fluid suction housing;

c. said drive shaft having a knockdown connection means between each said impeller for supporting said shaft in radial and axial alignment;

d. said connection means including two tubular shaft sections with each of said shaft sections being provided with teeth radially defined in an annular area about one end thereof;

e. said teeth provided to mesh together in forcible engagement and thereby support said shaft sections in alignment;

f. a support mandrel mounted within said shaft sections and connected to one of said shaft sections; and g. adjustable retaining means connected to said mandrel and to the other of said shaft sections for retaining said mandrel in tension and said teeth in forcible engagement. ]

12. *A centrifugal pump comprising:*

*a plurality of impellers mounted on a composite rotary drive shaft;*

*each of said impellers being mounted within a respective circular fluid discharge housing and mounted in fluid communication with a circular fluid suction housing;*

*said drive shaft having a knockdown connection means between each said impeller for supporting said shaft in radial and axial alignment;*

*said connection means including two tubular shaft sections with each of said shaft sections being provided with teeth radially defined in an annular area about one end thereof;*

*said teeth provided to mesh together in forcible engagement and thereby support said shaft sections in alignment;*

*a support mandrel mounted within said shaft sections and connected to one of said shaft sections;*

*adjustable retaining means connected to said mandrel and to the other of said shaft sections for retaining said mandrel in tension and said teeth in forcible engagement; and*

[ The pump of claim 11 wherein ] sleeve bearing means adapted for lubrication by pumped fluids [ is ] mounted in said pump to support said shaft between said impellers.

13. The pump of claim 12 wherein a fluid section housing is axially mounted on each end of each said fluid discharge housing.

14. The pump of claim 13 wherein said teeth are provided of curvate configuration.

15. The pump of claim 13 wherein the teeth defined about said one of said shaft sections are concave in profile as viewed from the axis thereof and the teeth defined about said other of said shaft sections are convex as viewed along the axis thereof.

16. The pump of claim 14 including tensioning means removably connected to said mandrel and to said other of said shaft sections for stressing said mandrel in tension and thereby drawing said teeth into forcible engagement.

17. The pump of claim 16 wherein said tensioning means includes hydraulic actuating means.

18. The pump of claim 16 wherein said tensioning means comprises removable piston and cylinder means adapted to stress said mandrel means in response to injection of hydraulic fluid under pressure.

19. The pump of claim 13 wherein each said suction housing includes a radially disposed baffle therein for preventing swirling of pumped fluids about the axis of said drive shaft.

[20. The pump of claim 1 wherein said impellers are tightly fitted on said shaft.]

[21. The pump of claim 1 wherein said shaft and said impellers mounted thereon are provided in dynamically balanced condition.]

*22. A centrifugal pump comprising: a plurality of impellers mounted on a composite rotary drive shaft; each of said impellers being mounted within a respective circular fluid discharge housing and mounted in fluid communication with a circular fluid suction housing; said drive shaft having a knockdown connection means for supporting said shaft in radial and axial alignment; said connection means including two tubular shaft sections with each of said shaft sections being provided with teeth radially disposed in an annular area about one end thereof; said teeth being provided to mesh together in forcible engagement and thereby support said shaft sections in alignment; a support mandrel mounted within said shaft sections and connected to one of said sections; and adjustable retaining means connected to said mandrel and to the other of said shaft sections for retaining said mandrel in tension and said teeth in forcible engagement; said support mandrel having a terminal sleeve connected to said one of said sections by a threaded connection said sleeve fitting closely within accommodating bores defined in said shaft sections at the juncture of said knockdown connection means and seal means between said sleeve and each of said shaft sections.*

*23. The pump of claim 22 characterized by said seal means comprising O-rings.*

*24. The pump of claim 22 characterized by at least one of said knockdown connection means being provided in said drive shaft between said impellers.*

*25. The pump of claim 22 characterized by the teeth defined about said one of said shaft sections being concave in profile as viewed from the axis thereof and the teeth defined about said other of said shaft sections being convex as viewed along the axis thereof.*

*26. The pump of any of the claims 22 characterized in that said knockdown connections means is provided between each two successive impellers.*

* * * * *